United States Patent [19]

Otomo et al.

[11] Patent Number: 4,620,995
[45] Date of Patent: Nov. 4, 1986

[54] SURFACE COATED GASKET SHEET

[75] Inventors: Nobuyuki Otomo; Hiroaki Chiba; Tsuneo Uno; Toshiki Aono; Kozo Suzuki, all of Tokyo, Japan

[73] Assignee: Marusan Packing Manufacturing Co., Tokyo, Japan

[21] Appl. No.: 749,761

[22] Filed: Jun. 28, 1985

[30] Foreign Application Priority Data

Jul. 18, 1984 [JP] Japan .................... 59-107670

[51] Int. Cl.$^4$ ............................. B05D 1/40
[52] U.S. Cl. .................. 427/420; 427/409; 118/DIG. 4; 428/422; 428/465
[58] Field of Search ............... 427/420, 409; 118/DIG. 4; 428/422, 465

[56] References Cited

U.S. PATENT DOCUMENTS

| 2,930,106 | 3/1960 | Wrotnowski et al. | 428/422 |
| 4,237,177 | 12/1980 | Slama | 428/422 X |
| 4,411,968 | 10/1983 | Reiser et al. | 427/115 X |
| 4,510,175 | 4/1985 | Burn | 427/420 X |

FOREIGN PATENT DOCUMENTS 2140154  2/1973  Fed. Rep. of Germany ... 118/DIG. 4

Primary Examiner—Shrive P. Beck
Attorney, Agent, or Firm—Cushman, Darby & Cushman

[57] ABSTRACT

Tough heat- and corrosion-resistant films of polytetrafluoroethylene (PTFE) are baked onto the surfaces of sheet-type gaskets in a curtain coating process. The gasket to be coated is passed through a flow of liquid PTFE-resin containing composition, the gasket inverted end-for-end, the opposite side coated, then baked, to form a tough film.

12 Claims, 3 Drawing Figures

SURFACE COATED GASKET SHEET

BACKGROUND OF THE INVENTION

This invention relates to gasket sheet materials, particularly of the type having a corrosion-resistant surface coating on the outside surfaces.

Gasket sheet materials of the prior art generally include a flat steel sheet as the core material and a joining sheet (ASTM F104 "F112000" or ASTM F104 "192000"), which is a compound of asbestos or non-asbestos fibers and synthetic rubber as a surface elastomer. Also as a surface material a beater sheet (ASTM F104 "F125000"), impregnated, spray coated, or roll coated with fluorine or a silicone phenol resin is used.

Gasket sheets made of a joint sheet have an advantage of better stress relaxation properties; however, they have the disadvantage of poor conformability because of their hard surface material. Moreover, due to insufficient impermeability of the surface material, the mechanical properties of the gasket sheet, such as tensile strength, tear strength and bending strength, are affected adversely. In addition, it has been found that the binder in the surface material disintegrates from chemical attack causing damage to the surface material due to corrosion and/or unwanted adhesion.

While the gasket sheets made of a beater sheet have the advantage of better conformability, they show rather poor stress relaxation properties. Surface treatment of gasket sheet is necessary to improve the stress relaxation properties. Spray coating, which is applied to the beater sheet gasket to improve its permeability, has the disadvantage that much of the coating agent is wasted since its recovery is very difficult. Roll coating has also a disadvantage that the coating cannot be made thick because of agent transcription by the rolls to which the composite is subjected.

DETAILED DESCRIPTION OF THE INVENTION

The present invention solves the abovementioned problems and is characterized in that a coating film of a heat and corrosion resistant sealing agent composed of a heat and corrosion resistant fluid resin, to which is optionally added a heat and corrosion resistant ceramic or carbon powder, is baked on the gasket sheet surfaces made of elastomers.

Baked films are formed on the sheared faces of the gasket sheet as well. The principal ingredients of such heat and corrosion resistant fluid resins is fluorine. Optionally, molybdenum, epoxy compounds, silicone, or other suitable materials are included. Illustrative heat and corrosion resistant ceramic powders include silicon carbide, zirconium, silicon nitride, and alumina.

A curtain flow coating method is used to apply the coating of the above-mentioned heat and corrosion resistant fluid resin or the fluid resin containing heat and corrosion resistant ceramic or carbon powder. In the curtain flow coating method, a sheet of gasket material passes through a curtain-like filmy flow of a predetermined width of the coating agent. Once applied, the coating is then baked in a furnace to form coated films on the surfaces and sheared faces of the gaskets. This process is described in more detail below in connection with the discussion of FIG. 3.

Since relatively insufficient coating material is applied to the departure or exit side of the sheared faces, it is necessary to reverse the approach direction of the gasket when coating the reverse side in the curtain flow coating method. The curtain flow coating method is capable of reducing consumption of the coating agent by approximately 70% in comparison with the spray-coating method. By selecting the width of the fluid curtain flow and movement speed of the gasket sheet passing through the fluid curtain flow, the thickness of the coated film on the surface of the gasket sheet can easily be adjusted in comparison with roll coating procedures.

DETAILED DESCRIPTION OF THE DRAWINGS

Figure 1:
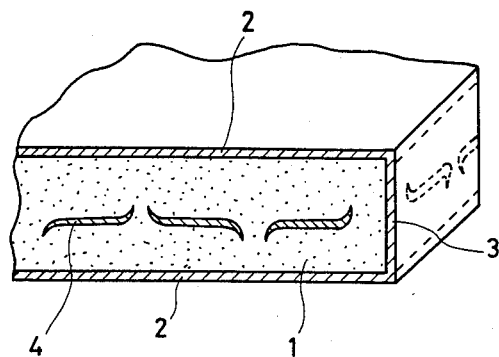
FIG. 1 is a cross-sectional perspective view of a gasket sheet according to one embodiment of the invention in which an elastomer and baked film coating have been applied to an apertured, punched hook metal profile.

Various embodiments of the invention are now described referring to the attached drawings, it being understood that the invention is not limited to the specific embodiments that are illustrated. Referring to FIG. 1 of the first embodiment, a core material with punched hooks 4 is provided inside an elastomer 1 of the gasket sheet and a baked film 2 5-100 microns in thickness is formed on the surface of the elastomer 1. In this embodiment, a coating film 3 is also provided on all the sheared faces (cut edges). Fluorine, the main ingredient of the heat and corrosion resistant fluid resin, is applied to the coating film as a heat and corrosion resistant sealing agent. Compositions of the core material, film coating and elastomer are given below. Optionally, the heat and corrosion resistant fluid resin also contains at least one heat and corrosion resistant ceramic powder, such as silicon carbide, zirconium, silicon nitride, alumina, or possibly other suitable powders, or carbon powder (ASTM N990 or N991). Carbon powders and ceramic powders are not used in combination. The amount of powder, be it ceramic or carbon, is in the range of from about 3 to 10% by weight based on the weight of the resin. The exact amount depends upon the nature of the gasket. This mixture is used as a heat and corrosion resistant sealing agent for the coating film.

The heat and corrosion resistant fluid resin, or the fluid resin containing a heat and corrosion resistant ceramic powder, or containing carbon powder, is applied by the above-described curtain flow coating method. The thus coated article is then baked in a furnace at the appropriate temperature in accordance with the curing requirements of the fluid resin composition to form the heat and corrosion resistant sealing films on the surface and sheared faces of the gasket sheets.

Figure 2:
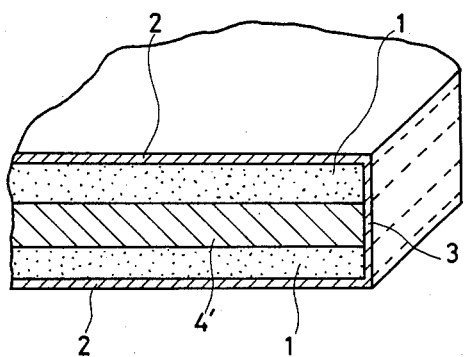
FIG. 2 is a cross-sectional perspective view of a gasket sheet according to another embodiment of the invention in which an elastomer coating and a baked film are applied to a metal sheet core material.

Referring to FIG. 2 of the second embodiment of this invention, a core material 4' made of a solid, imperforate metal sheet is provided inside the elastomer of the gasket sheet. The baked film 2 is formed on the surface of the elastomer 1 in the above-mentioned manner and the film 3 applied to all the sheared faces.

The fluid resin or the fluid resin containing ceramic powder or carbon powder employed is the same as that used in the first embodiment of the invention as described above.

The thickness of the coating applied depends upon several factors, but will usually fall within the range of about 5 to 100 microns. As a practical matter, a thickness in the range of from about 25 to about 40 microns is recommended for most sheet gaskets.

Figure 3:
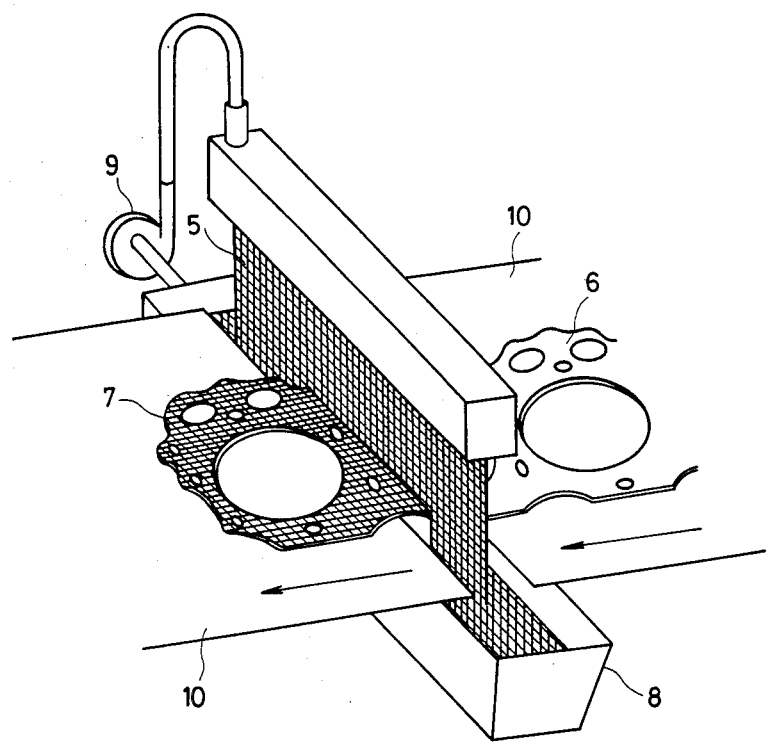
FIG. 3 is an elevated perspective view of a curtain flow coater apparatus used to prepare a sheet gasket in accordance with the process of the present invention.

FIG. 3 illustrates a curtain flow coating apparatus for carrying out the process of the present invention. In the process, a gasket sheet 6 having the elastomer layer 1 on it is passed beneath and through a flowing curtain 5 of the coating agent. Gasket sheet 6 is carried on a conveyor 10. Curtain flow of a preset width is maintained by recirculating excess coating agent from the coating agent reservoir tank 8 via a circulating pump 9 to the head distributing the coating agent. The speed of traversal of the gasket sheet 6 through the flowing curtain together with the flow rate and thickness of the fluid curtain flow 5 are both controlled, one necessarily related to the other, to provide a film coating 2 of the desired thickness.

The reverse side is also coated in a second pass; however, in order to ensure even coating of the exposed edges, the gasket sheet is inverted end-over-end so that the end to be last coated in the first pass is the end receiving the first coat in the second pass.

Baking times and temperatures depend on the nature of the coating film, underlying material (such as an elastomer (if present), and the like. For a Xylan 1010HB resin system coated on an elastomeric base, the baking time is 240° C.±10° C. for about 10 minutes.

The procedure of the present invention: A baked film of heat and corrosion resistant sealing agent formed on the surfaces of the gasket sheet maintains the gasket's sealability and impermeability for a substantially prolonged time. Accordingly, it gives good protection against corrosion of a core sheet, elastomer, and binder, and prevents deterioration of the mechanical properties of the gasket sheet itself, such as tensile strength, tear strength, and bending strength. Also it avoids the direct contact of the gasket material, which is mainly binder, with the mating sealing surfaces to prevent sticking.

Its better wear-resistant ability also reduces the fretting phenomena of sealing metal surfaces. The coating applied by the curtain flow coating method enables satisfactory recovery of the coating agent and saves 70% of agent consumption as compared with the spray coating method.

Compositions of The Coating Agent: The fluorine-containing resin used for the baked film was Xylan 1010HB, a product of the Whitford Corporation of West Chester, Pa. As the binder for the underlying elastomeric sheet 1 was a synthetic rubber, the baking or curing temperature for the baked film coating 4 was at no greater than about 250° C. Other resins believed to be suitable are various grades of TEFLON resins from duPont of Wilmington, Delaware or POLYPRON of Daikin, Tokyo, Japan; however, the baking temperature required for the resin must not be greater than the maximum temperature the underlying elastomer 1 is capable of tolerating without deterioration in properties. No particular temperature considerations need be made for laminated metal gaskets, graphite gaskets, or ceramic gaskets; however, with elastomer-containing gaskets, Xylan 1010HB is preferred.

The joint sheet material onto which the coating films of the present invention are applied are typically asbestos fiber reinforced or, more recently, non-asbestos fiber reinforced. Typical formulations are for an asbestos joint sheet in approximate weight percent:
asbestos: 75%
binder (EPDM rubber): 15%
other additives (reinforcing agents, antioxidants, antiozants, etc.) 10% while an illustrative non-asbestos joint sheet contains:
reinforcing fibers (KEVLAR polyamide): 75%
binder (EPDM rubber): 15%
miscellaneous additives (as above): 10%

While the above description has featured elastomer-containing, metal reinforced gaskets, other types of flat sheet gaskets are considered suitable for the coating process. These include laminated metal gaskets, graphite gaskets and ceramic gaskets.

Test Results: Products produced according to the present invention have been tested using the following test pieces:

The test pieces have a structure that consists of a core material of a flat steel sheet and asbestos joint sheets bonded on both sides of the sheet. They have the coated films of polytetrafluoroethylene (PTFE) resin, processed by the curtain flow coating method and baked at 220° C. in a furnace for 10 minutes. The baked film has a thickness of 50 microns, are annular in shape, and measure 55 mm outside diameter (O.D.) and 32 mm inside diameter (I.D.) by 1.35 mm thick.

TEST 1

The above-described test piece was attached to a testing jig to which pressure was applied. The testing jig included a first metal block provided with an opening 32 mm in diameter to simulate a cylinder block of the internal combustion engine, and a second metal block and having a flat surface covering the first metal block.

The jig was so constructed that a pressurized fluid may be filled in the opening of the first metal block through a duct. The test piece was interposed between these two blocks and the tightening torque was set at 40 kgf/cm$^2$. Engine oil (ASTM #3) was used as a pressurizing fluid. The temperature of the oil was set at 140° C. and the pressure was raised at a rate of 0.5 kgf/cm$^2$ every 20 minutes up to the maximum pressure of 10 kgf/cm$^2$ was reached.

The test piece was kept under the maximum pressure for 6 hours and 40 minutes. No leakage of the fluid was observed. When the test piece was taken out and visually checked, there was no infiltration of the fluid into the material and the material could be easily removed from the testing jig without sticking.

For comparison, a similar test was conducted using a test piece of conventional construction which did not have the baked film of the invention. The test piece became stuck to the surface of the metal block of the testing jig and it was difficult to release the test piece from the jig. There was a visual observation of oil infiltration on the surface of the material of the test piece in this case.

TEST 2

A test similar to the above Test 1 was conducted using a mixture of automotive anti-freeze and water as the pressurizing fluid. The temperature of the anti-freeze and water mixture was set at 95° C. The pressure was applied up to the maximum of 3 kgf/cm$^2$ by increasing the same at a rate of 0.5 kgf/cm² every 20 minutes. The maximum pressure was maintained for 8 hours. There was no leakage of the fluid observed. When the test piece was taken out and visually checked, there was no infiltration of the fluid inside the material and it could be easily removed without sticking from the testing jig.

For comparison, a similar test was conducted using a test piece with the conventional structure which was not provided with the baked film of the invention. This sample became stuck to the surface of the metal block of the testing jib. When the test piece was removed from the testing jig, it suffered considerable damage.

TEST 3

Three gasket sheets according to the first embodiment of the invention were used as test pieces. Three conventional gasket sheets without a baked film, though of a similar configuration, were also prepared. These six gasket sheets were immersed in engine oil at 140° C. for 3.5 hours and the samples were weighed to determine the change in weight before and after the test. The result was that the weight increase was 1.31-1.44% with the test pieces according to the invention on the surface of which was performed a baked film, which the weight incrase was 1.77-2.15% with the test pieces with the conventional structure.

Each gasket sheet was cut and the change in the condition of the cut face was visually observed. Infiltration of black engine oil was observed in the conventional gasket sheets while no such infiltration was observed in the gasket sheets according to the present invention.

TEST 4

A test was carried out by mounting the gasket sheet of the first embodiment to a turbocharged diesel engine, developing 195 HP, in a dynamometer cell. The engine was subjected to 50-hour continuous operation by accelerating/decelerating the speed every 2.5 minutes from idling (500 rpm) to full load (3,000 rpm). The temperature of the gasket sheet during the operation was substantially at 180° C. The cylinder head of the engine was then removed and the test piece was inspected. The test piece could be completely removed from the engine. No damage or infiltration of oil was visually observed.

We claim:

1. A process for providing a cylinder head gasket with a heat-resistant, corrosion-resistant, substantially uniform baked PTFE film coating layer on all of the gasket surfaces of a core, said process comprising the steps of:
    (a) providing as a gasket core a sheet of metal having fiber-reinforced rubber sheets bonded to two opposite faces thereof;
    (b) applying a film coating of a PTFE liquid resin composition to said core by passing said core at least once through a flowing curtain of the PTFE liquid resin composition; and
    (c) heating the thus-coated core to form a tough, adherent, baked-on film on the gasket surfaces of said core.

2. The process of claim 1 in which the coating layer is from about 5 to about 100 microns in thickness.

3. The process of claim 2 in which the coating layer is from about 25 to about 40 microns in thickness.

4. The process of claim 1 in which the PTFE liquid resin composition also contains up to about 10% by weight, based on the weight of the PTFE, of at least one ceramic powder.

5. The process of claim 4 in which the PTFE liquid resin coating composition contains from about 3 to 10% by weight of at least one ceramic powder.

6. The process of claim 1 in which the PTFE liquid resin composition also contains up to 10% by weight, based on the weight of the PTFE, of carbon powder.

7. The process of claim 6 in which the PTFE liquid resin coating composition contains from about 3 to 10% by weight of ceramic powder.

8. The process of claim 1, wherein:
    said gasket core has two external opposite faces corresponding to said two opposite faces of said sheet of metal; and
    said step of applying a film coating includes passing said core through said flowing curtain of the PTFE liquid resin composition in a first pass with said core so oriented as to cause one of said faces of said core to become flow-coated with said PTFE liquid resin composition and then passing said core through said flowing curtain of the PTFE liquid resin composition in a second pass with said core so oriented as to cause the other of said faces of said core to become flow-coated with said PTFE liquid resin composition.

9. The process of claim 8, wherein:
    said sheet of metal is made of steel.

10. The process of claim 9, wherein:
    said sheet of steel is perforated and said fiber-reinforced rubber sheets are bonded to one another through at least some of such perforations.

11. The process of claim 9, wherein:
    said fiber-reinforced sheets are made of asbestos fiber-reinforced EPDM rubber.

12. The process of claim 9, wherein:
    said fiber-reinforced sheets are made of polyamide fiber-reinforced EPDM rubber.

* * * * *